United States Patent [19]

Röck et al.

[11] Patent Number: 4,984,929
[45] Date of Patent: Jan. 15, 1991

[54] FITTING FOR FASTENING THE RAIL MEMBER OF A DRAWER

[75] Inventors: Erich Röck, Höchst; Helmut Hollenstein, Lustenau, both of Austria

[73] Assignee: Julius Blum Gesellschaft m.b.H., Hochst, Austria

[21] Appl. No.: 353,207

[22] Filed: May 16, 1989

Related U.S. Application Data

[63] Continuation of Ser. No. 134,303, Dec. 15, 1987, abandoned.

[30] Foreign Application Priority Data

Jan. 8, 1987 [AT] Austria .................................. 19/87

[51] Int. Cl.$^5$ ............................................. F16B 12/24
[52] U.S. Cl. .................................. 403/230; 403/353; 403/407.1
[58] Field of Search ................ 403/230, 231, 407.1, 403/406.1, 409.1, 263, 252, 254, 353

[56] References Cited

U.S. PATENT DOCUMENTS

| | | | |
|---|---|---|---|
| 2,710,053 | 6/1955 | Hamilton | 403/263 X |
| 2,874,388 | 2/1959 | Edelen, Sr. | 403/407.1 X |
| 3,288,192 | 11/1966 | Bollinger | 403/353 X |
| 3,347,574 | 10/1967 | Strubin | 403/407.1 |
| 4,068,332 | 1/1978 | Ball et al. | 403/230 X |
| 4,134,564 | 1/1979 | Hanna | 403/353 X |
| 4,325,649 | 4/1982 | Röck | 403/231 |
| 4,353,663 | 10/1982 | Glickman | 403/230 |
| 4,502,807 | 3/1985 | Salice | 403/407.1 X |

*Primary Examiner*—Peter M. Cuomo
*Attorney, Agent, or Firm*—Wenderoth, Lind & Ponack

[57] ABSTRACT

A fitting to connect the front plate of a drawer with a rail member thereof includes a dowel casing which can be fitted into the front plate and a hook member connected to the front end of the rail member to be engaged in the dowel casing. A metallic disk provides rigidity for the dowel casing. The hook member has a flange which abuts flush with the front face of the dowel casing and which has a bevelled portion.

6 Claims, 2 Drawing Sheets

FITTING FOR FASTENING THE RAIL MEMBER OF A DRAWER

This application is a continuation of now abandoned application, Ser. No. 07/134,303 filed on Dec. 15, 1987 now abandoned.

FIELD AND BACKGROUND OF THE INVENTION

The invention relates to a fitting for fastening a rail member of a drawer to a front plate or rear wall of the drawer, the rail member being provided with a hook member.

In modern furniture construction, drawers are widely known in which a drawer front plate is adjustably fastened to drawer side walls, by means of clip-in fittings. In some cases, a rail member is provided above each drawer side wall and extends from the front plate to the rear wall of the drawer or to a support member at the rear wall.

It is known to use the rail members for adjustment of the front plate. In such arrangement, each rail member is provided with a threaded pin which is screwable into a holding member which is fittable into the front plate.

Furthermore, generally known are furniture connectors with dowel-like casings which allow clamping connection between parts of pieces of furniture.

SUMMARY OF THE INVENTION

It is the object of the invention to provide a connecting fitting which allows quick engagement of a rail member in the front plate or rear wall of a drawer.

According to the invention this is achieved by a dowel casing which is fittable into the front plate or the rear wall and into which is engageable a hook of a hook, member that is connected with the rail member or molded thereto, the hook projecting through an opening into the dowel casing.

The dowel casing according to the invention can be mounted in an easy and quick manner without the necessity of screws. A particular alignment need not be taken into consideration. Moreover, the complete fitting is received in the front plate.

It is advantageously provided that a metallic disk is inserted into the dowel casing which is made of plastics material, such disk having an opening through which extends the hook of the hook member.

By means of the metallic disk, the forces exerted by the hook can be taken up by a larger area of the dowel casing.

An embodiment of the invention provides that the hook member is provided with a flange which abuts flush with the dowel casing in the mounted position and is bevelled at a side opposite to and aligned with the hook.

Due to this arrangement, the rail member and the hook member are snuggly held by the dowel casing in the engaged position, with an easy engaging and disengaging of the hook member nevertheless being possible.

In one embodiment, the support of the rail member is improved by providing the hook member with a cylindrical shoulder which is snuggly received in the opening of the dowel casing.

BRIEF DESCRIPTION OF THE DRAWINGS

In the following an embodiment of the invention will be described in more detail with reference to the accompanying drawings, in which.

DESCRIPTION OF THE PREFERRED EMBODIMENT

Figure 1:
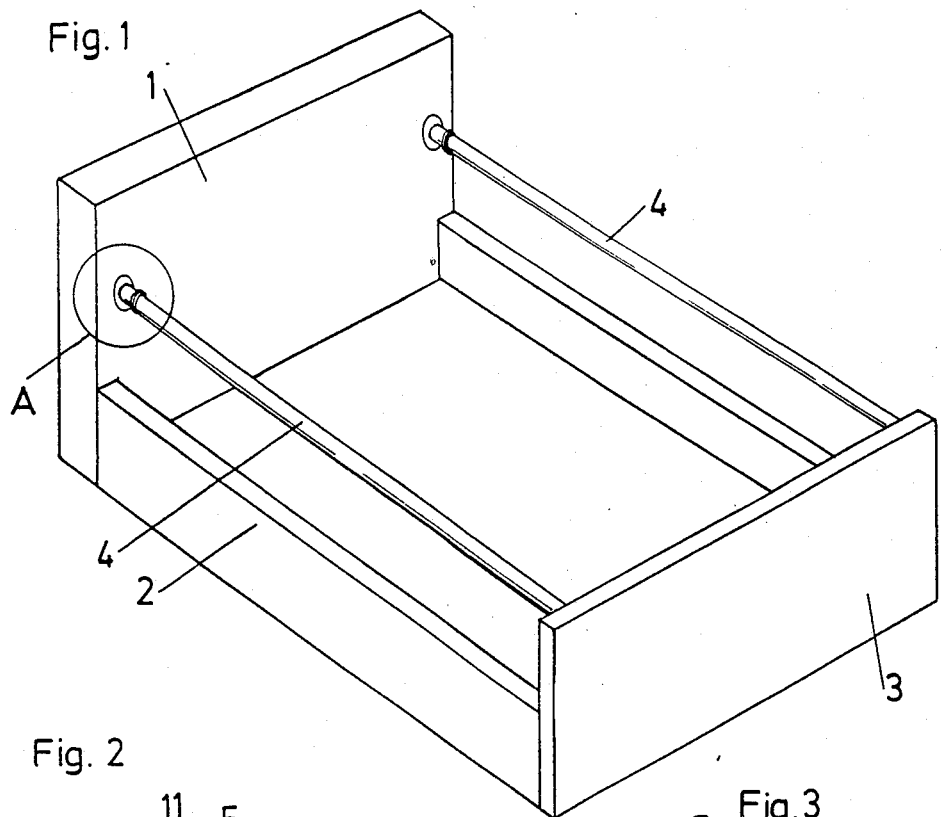
FIG. 1 is a perspective view of a drawer incorporating to the invention.

In the drawings, reference number 1 designates a drawer front plate, reference number 3 a drawer rear wall and reference number 2 drawer side walls.

The fitting according to the invention comprises a circumferentially closed cylindrical dowel casing 5 which is fittable into the front plate 1 (or alternatively in the rear wall and a hook member 6 which is screwed into a rail member 4 of the drawer. The hook member 6 is advantageously made of a diecast material but it can equally be of plastics material.

The dowel casing 5 is injection molded plastics material. The dowel casing 5 has a hollow space or interior 8 and an axially central circumferentially closed circular opening 9. A metallic disk 7 having an opening corresponding to opening 9 is fitted into the hollow space 8 and is held therein by means of a projection or projections 11. A surface of disk 7 is abutted by hook 13 and extends around the entire circumference of opening 9.

The hook member 6 has a head 12 with a hook 13.

Figure 2:
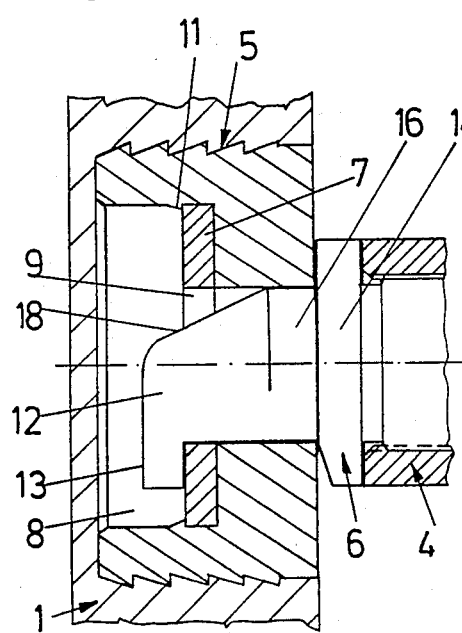
FIG. 2 is a vertical sectional view of a fitting according to the invention, with a rail member being engaged.
Figure 3:
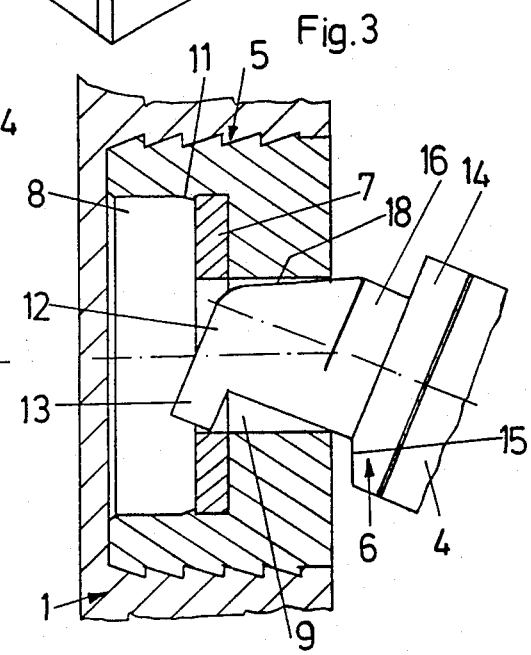
FIG. 3 is a vertical sectional view of a fitting according to the invention, with a the hook member being shown in a position intermediate between engaged and disengaged, positions.
Figure 4:
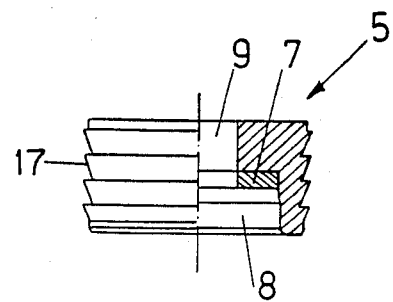
FIG. 4 is a side view, partially in section, of a dowel casing according to the invention.
Figure 5:
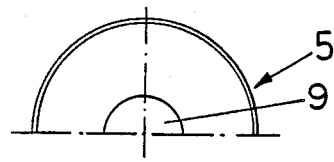
FIG. 5 is an end view of a dowel casing according to the invention.
Figure 6:
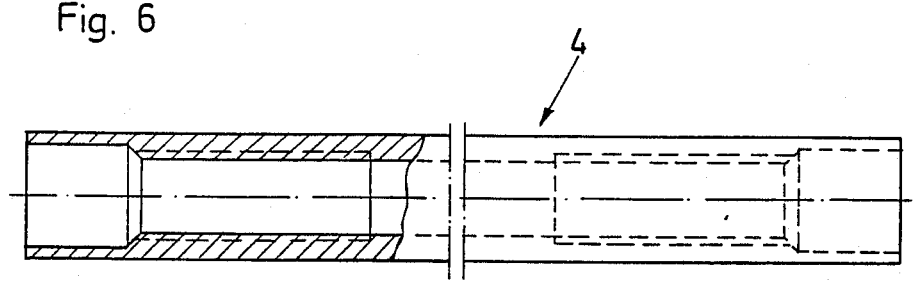
FIG. 6 is a side view of the rail member, parts thereof being shown in section.
Figure 7:
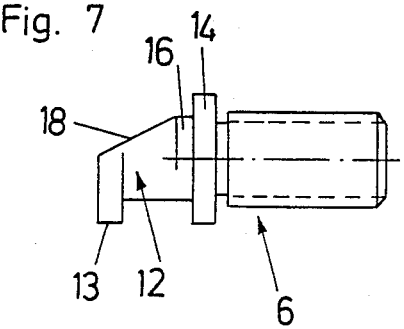
FIG. 7 is a side view of the hook member.
Figure 8:
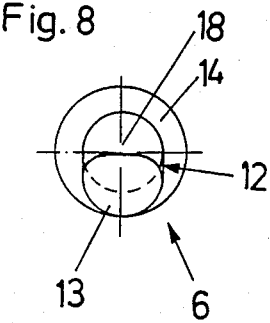
FIG. 8 is an end view of the hook member.

To permit insertion of the head 12 into the opening 9, the head 12 has a bevelled portion 18 at a position radially opposite hook 13. The rail member 4 is fastened by pushing the dowel casing 5 into the front plate 1 in a manner known per se and by then screwing or inserting the hook member 6 into the rail member 4. Then the hook member 6 is engageable into the dowel casing 5 through the opening 9 in the manner shown in FIG. 3, so that the hook 13 becomes positioned behind the metallic disk 7, as shown in FIG. 2, in a fastened position whereat hook member 6 extends axially of dowel casing 5.

The hook member 6 has a flange 14 which abuts flush with the dowel casing 5, i.e. at the front side thereof. The flange 14 is provided with a bevelled portion 15 opposite the hook 13 to prevent the flange from impeding engaging and disengaging movements of the hook member 6.

The avoid wobbling of the rail member 4, the hook member is provided with a cylindrical shoulder 16 which is snuggly received in the opening 9 of the dowel casing 5.

The dowel casing 5 has, in a manner known per se, circumferential ribs 17 which ensure improved anchoring of the dowel casing 5 in the front plate 1.

What is claimed is:

1. A fitting for fastening an end of a rail member of a drawer to a front plate or to a rear wall of the drawer, said fitting comprising:
   a circumferentially closed dowel casing to be fitted into the front plate or rear wall of the drawer, said dowel casing having a hollow interior and a circumferentially closed circular opening extending through said dowel casing axially centrally thereof into said interior;
   a hook member to be at a respective end of the rail member of the drawer, said hook member including a head having a hook extending through said circular opening in said dowel casing to a fastened position to fasten said hook member to said dowel casing, said hook having a circumferential dimension extending along only a portion of the circumference of said hook member, said hook member extending in the axial direction of said dowel casing and having a cylindrical shoulder snugly received in said circular opening when said hook member is in said fastened position, and said head having a beveled portion at a position radially opposite said hook to permit insertion of said hook through said circular opening, said beveled portion extending from a free end of said hook member to a position axially beyond said hook; and
   an abutment surface within said interior to be abutted by said hook, said abutment surface extending entirely around the circumference of said circular opening.

2. A fitting as claimed in claim 1, wherein said dowel casing is formed of a plastic material, and further comprising a metal disk positioned within said interior of said dowel casing and having an opening corresponding to said opening in said dowel casing.

3. A fitting as claimed in claim 2, wherein said abutment surface comprises a surface of said metal disk.

4. A fitting as claimed in claim 1, wherein said hook member has a flange abutting flush with said dowel casing, said flange having a further beveled portion opposite said hook.

5. A fitting as claimed in claim 1, wherein said hook member has a threaded protion to be threaded onto the rail member.

6. A fitting as claimed in claim 1, wherein said dowel casing has a cylindrical exterior, and said circular opening is positioned coaxially of said exterior.

* * * * *